UNITED STATES PATENT OFFICE.

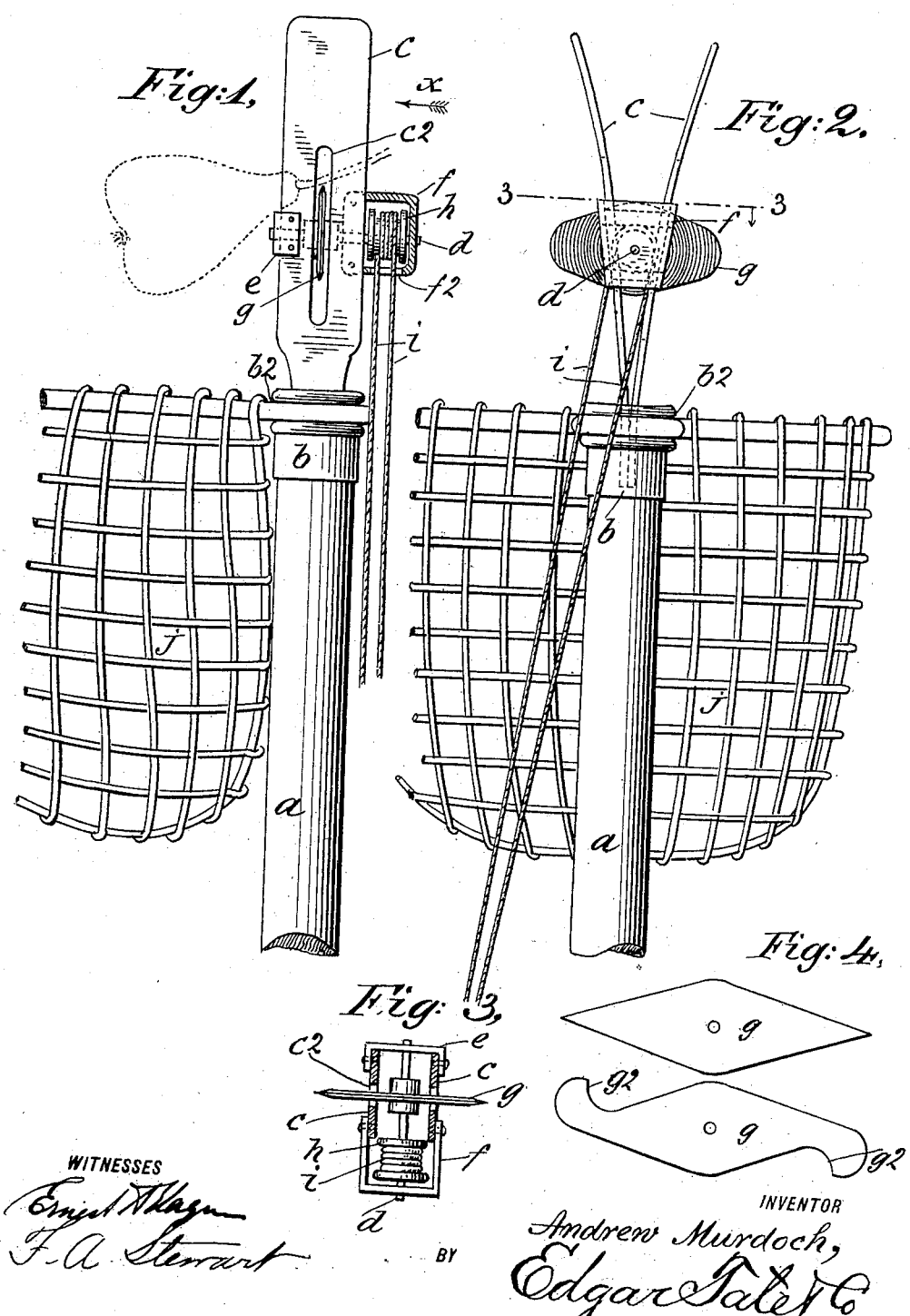

ANDREW MURDOCH, OF NEW YORK, N. Y.

FRUIT-PICKING DEVICE.

No. 838,131.  Specification of Letters Patent.  Patented Dec. 11, 1906.

Application filed July 13, 1906. Serial No. 326,034.

*To all whom it may concern:*

Be it known that I, ANDREW MURDOCH, a subject of the King of Great Britain, residing at New York, in the county of New York and State of New York, have invented certain new and useful Improvements in Fruit-Picking Devices, of which the following is a specification, such as will enable those skilled in the art to which it appertains to make and use the same.

This invention relates to devices for picking fruit, such as oranges, pears, apples, plums, and similar fruits; and the object thereof is to provide an improved device of this kind by means of which fruit of the class specified may be conveniently picked from the trees bearing the same by an operator standing on the ground, this operation being performed in such a manner as not to injure the fruit.

The invention is fully disclosed in the following specification, of which the accompanying drawings form a part, in which the separate parts of my improvement are designated by suitable reference characters in each of the views, and in which—

Figure 1 is a side view of my improved fruit-picker and indicating the method of operating the same; Fig. 2, a view of the fruit-picker at right angles to that shown in Fig. 1 looking in the direction of the arrow $x$ of Fig. 1; Fig. 3, a section on the line 3 3 of Fig. 1, and Fig. 4 a view of different forms of blades which may be used in my improved fruit-picker.

In the practice of my invention, I provide a handle $a$, which may be of any desired length and composed of any preferred material and which in practice is preferably made of telescopic or separate detachably-connected sections in order that the requisite length may be obtained. The handle $a$ is preferably provided at one end with a collar or sleeve $b$, having a groove $b^2$, and connected with said end of the handle in any desired manner are diverging arms $c$, preferably composed of flat or sheet metal, but which may be composed of any desired material. The arms $c$ are provided in the form of construction shown with longitudinal slots or openings $c^2$.

Mounted between the arms $c$ at a predetermined distance from the end of the handle is a shaft $d$, parallel with the adjacent surfaces of said arms, and the supports of this shaft in the form of construction shown consist of a transverse plate or member $e$ and a cage or casing $f$, secured to the opposite side edges of said arms, and secured to said shaft centrally thereof is a blade $g$, rotatable in the slots or openings $c^2$ in the arms $c$, and said shaft is also provided with a drum $h$, which is contained within the cage or casing $f$, which forms a shield or guard therefor, and wound on the drum $h$ in opposite directions are cords $i$, which pass through a hole or opening $f^2$ in the bottom of the cage or casing $f$.

In Fig. 4 I have shown two different forms of knives which may be used on the shaft $d$, one of said knives being diamond-shaped in form, and the opposite sides of the end portions thereof are in practice provided with cutting edges, the other form of blade being shown as provided with oppositely-directed hook members $g^2$ at its opposite ends. I also connect with the end of the handle $a$, adjacent to the arms $c$ and on the sides of said arms opposite that on which the drum $h$ is mounted, a basket $j$ to receive the fruit when it is picked or cut from the stem by the blade $g$. This basket may be lined with soft material, if desired, and my invention is not limited to the use of the basket $j$, and any suitable receiver for the fruit may be connected with the end of the handle $a$ or with the arms $c$ in such manner as to receive the fruit when the latter is clipped or cut from the stem in the operation of the device as hereinafter described.

In practice the device is manipulated from the ground, so as to pass the stem of the fruit to be picked between the arms $c$, as indicated in dotted lines in Fig. 1. One of the cords $i$ is then pulled so as to turn the blade $g$, and the stem of the fruit is severed and the fruit dropped into the basket or receiver $j$.

It will be understood that the blade $g$ may be turned in either direction by reason of the fact that either of the cords $i$ may be pulled for this purpose, and when one of the said cords is pulled the other is wound on the drum $h$.

Although I have shown and described two forms of blades that may be employed, it will be understood that my invention is not limited to any particular device of this class, and various changes in and modifications of the construction described may be made without departing from the spirit of my invention or sacrificing its advantages.

Having fully described my invention, what

I claim as new, and desire to secure by Letters Patent, is—

1. A fruit-picking device, comprising a handle, two diverging arms connected with one end thereof, a shaft mounted between said arms, a blade connected with said shaft, a drum connected with one end of said shaft, and cords wound on said drum in opposite directions.

2. A fruit-picking device, comprising a handle, two diverging arms connected with one end thereof, a shaft mounted between said arms, a blade connected with said shaft, a drum connected with one end of said shaft, cords wound on said drum in opposite directions, and a receiver supported on the opposite side of the handle from said drum.

In testimony that I claim the foregoing as my invention I have signed my name, in presence of the subscribing witnesses, this 12th day of July, 1906.

ANDREW MURDOCH.

Witnesses:
F. A. STEWART,
C. E. MULREANY.